United States Patent [19]

Tomizawa

[11] 4,370,549
[45] Jan. 25, 1983

[54] ELECTRONIC COUNTER CIRCUIT FOR TAPE RECORDER

[75] Inventor: Yoshio Tomizawa, Tama, Japan

[73] Assignee: Olympus Optical Co., Ltd., Tokyo, Japan

[21] Appl. No.: 136,450

[22] Filed: Apr. 2, 1980

[30] Foreign Application Priority Data

Apr. 20, 1979 [JP] Japan ................................ 54-52980

[51] Int. Cl.³ ............................................ G06M 3/14
[52] U.S. Cl. ......................... 235/92 MP; 235/92 EV; 235/92 FP; 360/137
[58] Field of Search .......... 235/92 EV, 92 MP, 92 T, 235/92 FP, 92 MS, 103; 360/137; 364/707

[56] References Cited

U.S. PATENT DOCUMENTS

| | | | |
|---|---|---|---|
| 3,852,575 | 12/1974 | Daniels et al. | 235/92 T |
| 3,860,914 | 1/1975 | Zitelli et al. | 235/92 FP |
| 4,005,409 | 1/1977 | Feuer | 235/92 FP |
| 4,107,516 | 8/1978 | Huidsten | 235/92 FP |

FOREIGN PATENT DOCUMENTS 52-21737 2/1977 Japan ................................... 364/707

*Primary Examiner*—Joseph M. Thesz
*Attorney, Agent, or Firm*—Frishauf, Holtz, Goodman & Woodward

[57] ABSTRACT

An electronic counter circuit counts pulse signals generated according to the rotation of a takeup shaft of a tape recorder to display a value corresponding to a run of a tape. In the electronic counter circuit, a power supply voltage is supplied to a counter through a voltage stabilizing circuit and a switching circuit is connected between the voltage stabilizing circuit and a power supply for electrically interrupting power to the voltage stabilizing circuit a predetermined time after a motor is electrically interrupted to cause the rotation of the takeup shaft to be stopped.

5 Claims, 1 Drawing Figure

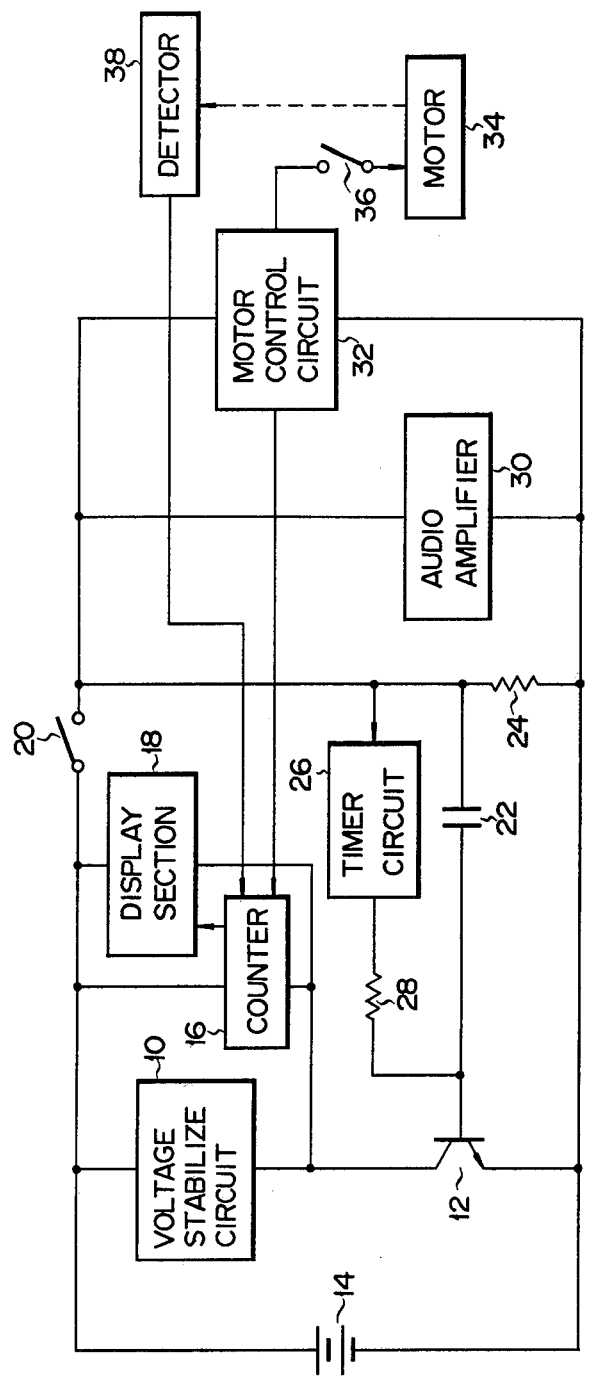

ELECTRONIC COUNTER CIRCUIT FOR TAPE RECORDER

BACKGROUND OF THE INVENTION

This invention relates to an electronic counter circuit for use in a tape recorder etc.

Recently, an electronic counter circuit has been used in a tape recorder to count pulses generated according to the rotation of a reel shaft so as to display a run of a tape on a display element such as a liquid crystal. Since an electronic counter circuit has to be driven by a stabilized voltage, a power supply voltage of a tape recorder must be applied to the electronic counter through a voltage stabilizing circuit. The electronic counter circuit may be formed of a CMOS to make a power consumption smaller. The voltage stabilizing circuit consumes more electrical power as compared with the electronic counter circuit. Where the voltage stabilizing circuit for the electronic counter is connected directly to a power supply, the voltage stabilizing circuit wastefully dissipates more electrical power even during the inoperative time of the tape recorder. Normally, the electronic counter circuit and voltage stabilizing circuit are connected to the power supply through a switch in interlock with a stop button of operation buttons of the tape recorder. This switch is opened during the inoperative time of the tape recorder and closed during other time periods. By doing this, the voltage stabilizing circuit can be electrically interrupted during the inoperative time of the tape recorder, thereby perventing wasting of electrical power. Even where temporary stopping is effected so as to change from a playback to a rewind mode, the voltage stabilizing circuit is electrically interruped and the contents of the counter is reset. For this reason, the subsequent count display is erroneously made and it becomes impossible to display an absolute amount of run of a tape.

SUMMARY OF THE INVENTION

It is accordingly an object of this invention to provide an electronic counter circuit which can make a dissipation power smaller in a voltage stabilizing circuit during the inoperative time of a tape recorder etc. and can hold the contents of a counter during the temporary stopping time.

To attain this object, there is provided an electronic counter circuit comprising a power supply terminal, a counter to which a drive voltage is supplied from the power supply terminal, and switching means for electrically separating the counter from the power supply terminal when no count operation of the counter is effected during a predetermined time period.

BRIEF DESCRIPTION OF THE DRAWING

The single FIGURE is a diagrammatic view showing an electronic counter circuit according to the invention, as applied to a tape recorder.

DETAILED DESCRIPTION OF THE PREFERRED EMBODIMENT

A conventional voltage stabilizing circuit 10 formed of a zener diode, transistor etc. is connected through an NPN type transistor 12 (a switching means) to a power supply 14. A transistor 12 has its collector connected to the voltage stabilizing circuit 10 and its emitter to a negative terminal of the power supply 14. Where a commercial AC power supply is used as a power supply, it is connected through an AC/DC converter to the voltage stabilizing circuit 10. A counter 16 and display section 18 formed of a liquid crystal etc. are connected to the voltage stabilizing circuit 10. The counter 16 is an up/down counter. The output of the counter 16 is supplied to the display section 18. A positive terminal of the power supply 14 is connected to the base of the transistor 12 through a main switch 20 and capacitor 22. The main switch 20 is operated in cooperation with an operation button (not shown) of a tape recorder. The main switch 20 is closed when operating buttons other than a stop button are depressed and opened when the stop button is depressed. At a normal time, the main switch 20 is maintained at an opened state. A junction between the main switch 20 and the capacitor 22 is connected through a resistor 24 to a negative terminal of the power supply 14, and through a timer circuit 26 and resistor 28 to the base of the transistor 12. The timer circuit 26 is comprised of an oscillator, counter etc. (not shown), and after a predetermined time period following a change of an input signal from a high to a low level, the change is transmitted to an output side of the timer 26 and an output signal of the timer 26 is made at a low level. That is, the transistor 12 is rendered OFF by making a potential on the base of the transistor 12 at a low level. An audio amplifier 30 is connected through the main switch 20 to the power supply 14. The audio amplifier 30 is an ordinary amplifier for reproducing a signal which is detected by a magnetic head not shown. A motor control circuit 32 for controlling the rotation direction and rotation speed of a motor 34 according to the operation of the operation buttons is connected through the main switch 20 to the power supply 14. A control signal delivered from the motor control circuit 32 is supplied through a pause switch 36 to the motor 34. A control signal according to the rotation direction of the motor 34 is supplied from the motor control circuit 32 to an up/down control terminal of the counter 16.

The pause switch 36 is in interlock with a pause switch of the operation buttons of the tape recorder and is normally closed. When the pause button is depressed, the switch 36 is opened. By the depression of the pause button the operation of a tape recorder can be temporarily stopped irrespective of the other operation buttons. The once-interrupted operation is continued by releasing the pause button. The rotation of the motor 34 is transmitted to a tape takeup shaft or a tape supply shaft. A rotation detector 38 for producing a pulse per shaft revolution is provided on the takeup shaft or the supply shaft. The output pulse of the detector 38 is supplied to the clock input terminal of the counter 16. The counter 16 and timer circuit 26 are constructed by a CMOS type integrated circuit to make power consumption smaller.

The operation of the illustrated embodiment will be explained below.

Now suppose that the tape recorder is set in a playback mode with the pause switch 36 closed. The main switch 20 is closed by depressing the playback button. When electrical current flows from the positive terminal of the power supply 14 through the resistor 24 to the negative terminal of the power supply 14, the emitter of the transistor 12 becomes a low level and the transistor 12 is rendered ON. As a result, a power supply voltage is applied to the voltage stabilizing circuit 10 connected in series with the transistor 12. The voltage stabilizing circuit 10 supplies a stabilized voltage to the counter 16 and display device 18 for operation. Since the main switch 20 is closed, the audio amplifier 30 and motor control circuit 32 is energized. The motor control circuit 32 supplies a control signal for effecting a playback operation to the motor 34. By the depression of the playback button a magnetic head is operated such that it contacts with the tape. The takeup shaft is rotated by the motor 34, causing the tape to be run to permit a sound signal to be reproduced. At this time, a pulse is supplied from the detector 38 to the counter 16 each time the takeup shaft makes one rotation, and a count output is supplied to the display device 18 to display the contents corresponding to a run of the tape. In this embodiment, the operation of the tape recorder is temporarily stopped by the pause switch 36 which has no relevancy to the voltage stabilizing circuit 10. Therefore, there is no chance that the contents of the counter 16 will be reset at the temporary stopping time. Where a change from a playback to another mode is effected, it is customary to once depress the stop button and then depress another operation button. When the stop button is depressed the main switch 20 is opened. Since, however, a high level signal is delivered from the timer circuit 26, the transistor 12 is maintained at the ON state and the contents of the counter is not reset. If before the passage of a delay time of the timer circuit 26 the operation button for the next operation is depressed, a count operation is restarted from a count value interrupted. Where, on the other hand, the operation of the tape recorder is to be stopped, the stop button is depressed and the main switch 20 is kept open. After the passage of a predetermined time period of the timer circuit 26, the transistor 12 is rendered OFF by the timer circuit 26 and the voltage stabilizing circuit 10 is electrically interrupted. The delay time of the timer circuit 26 is set to be usually a few tens of seconds. For this reason, the voltage stabilizing circuit 10 is automatically electrically interrupted during the inoperative time of the tape recorder, thus preventing a wasteful dissipation of power. Since such interruption is electrically controlled, an erroneous operation resulting from, for example, the forgetting of switch cutting, an encountered in the case of a mechanical switch, can be prevented and a saving in space can also be attained.

What is claimed is:

1. A tape recorder comprising:
   a source of electrical power;
   voltage stabilizing means coupled to said power source for stabilizing a voltage supplied from said power source;
   counter means, power-supplied by said voltage stabilizing means, for indicating an amount of tape movement;
   operating switch means coupled to said power source and which is selectively operable for selectively stopping movement of the tape of the tape recorder;
   timer means responsive to operation of said operating switch means for stopping said movement of the tape for generating an inhibit signal upon the lapse of a predetermined time period after said operation of said operating switch means; and
   switching means coupled between said power source and said voltage stabilizing means and further coupled to said timer means for electrically disconnecting said voltage stabilizing means from said power source responsive to said inhibit signal from said timer means.

2. The tape recorder of claim 1, comprising at least one reel on which is wound recording tape, and wherein said counter means comprises means for producing pulses as a function of the rotation of said at least one reel, and a counter section for counting said pulses.

3. The tape recorder of claim 1 or 2, wherein said operating switch means generates a signal indicating operation of said operating switch means to stop said movement of the tape, said timer means generating said inhibit signal upon the lapse of a predetermined time period after generation of said signal by said operation switch means.

4. The tape recorder of claim 1 or 2, wherein said operating switch means comprises a manually operable switch, and wherein said tape recorder comprises a drive motor coupled to said power source through said manually operated switch.

5. The tape recorder of claim 1 or 2, wherein said switching means coupled between said power source and said voltage stabilizing means comprises a switching transistor.

* * * * *

UNITED STATES PATENT AND TRADEMARK OFFICE
CERTIFICATE OF CORRECTION

PATENT NO. : 4,370,549

DATED : January 25, 1983

INVENTOR(S) : Yoshio TOMIZAWA

It is certified that error appears in the above-identified patent and that said Letters Patent is hereby corrected as shown below:

COLUMN 1, line 16, after "CMOS to make" delete "a";

COLUMN 2, line 46, after "irrespective of the" insert --state of--;

line 47, change "once-interrupted" to --interrupted--.

Signed and Sealed this

Thirty-first Day of May 1983

[SEAL]

Attest:

DONALD J. QUIGG

Attesting Officer

Acting Commissioner of Patents and Trademarks